(12) United States Patent
Harari (10) Patent No.: US 7,937,912 B2
(45) Date of Patent: May 10, 2011

(54) METHOD FOR MAKING A CONTAINER COMPRISING TWO OR MORE COMPARTMENTS

(75) Inventor: Marke Harari, Roz Landrieux (FR)

(73) Assignee: Again Anew Innovations, LLC, Falmouth, KY (US)

(*) Notice: Subject to any disclaimer, the term of this patent is extended or adjusted under 35 U.S.C. 154(b) by 0 days.

(21) Appl. No.: 12/279,151

(22) PCT Filed: Feb. 15, 2007

(86) PCT No.: PCT/FR2007/000279
§ 371 (c)(1), (2), (4) Date: Aug. 12, 2008

(87) PCT Pub. No.: WO2007/093713
PCT Pub. Date: Aug. 23, 2007

(65) Prior Publication Data
US 2009/0013650 A1    Jan. 15, 2009

(30) Foreign Application Priority Data
Feb. 15, 2006   (FR) ..................... 06 01314

(51) Int. Cl.
*B65B 51/10* (2006.01)
*B65B 47/02* (2006.01)
*B65D 1/36* (2006.01)

(52) U.S. Cl. ............. 53/477; 53/158; 53/539; 53/559; 53/375.9; 209/500; 209/501

(58) Field of Classification Search ............ 53/403, 53/443, 445, 453, 456, 464, 469, 477, 479, 53/539, 559, 574, 361, 375.9, 158; 220/500–502
See application file for complete search history.

(56) References Cited

U.S. PATENT DOCUMENTS
2,975,473 A * 3/1961 Hagen et al. .......... 264/527
3,114,172 A * 12/1963 Coste .................. 264/523
(Continued)

FOREIGN PATENT DOCUMENTS
DE    1243860    7/1967
(Continued)

OTHER PUBLICATIONS
International Search Report for PCTFR2007/000279 mailed Jul. 18, 2007.
(Continued)

*Primary Examiner* — Christopher Harmon
(74) *Attorney, Agent, or Firm* — Wood, Herron & Evans, LLP (57) ABSTRACT

The invention concerns a method for making a container (1) comprising two or more compartments, said method including the following steps: a first step of heat sealing (S1) performed between two sheets (111, 112) so as to form the periphery of the container and performed at a temperature such that said seal (S1) is resistant to a predetermined stress, while providing filling orifices (12), a second step of heat sealing (S2) performed to form at least one separation between the compartments (13) and performed at a second temperature lower than said first temperature and such that said seal (S2) is breakable by said stress, a third step of filling said compartments (13). The invention is characterized in that after said first sealing step, the two sealed sheets (111, 112) are arranged in a mold (2, 2') whose shape they match under the pressure of a gas.

11 Claims, 7 Drawing Sheets

U.S. PATENT DOCUMENTS

| | | | | |
|---|---|---|---|---|
| 3,804,077 | A * | 4/1974 | Williams | 126/263.1 |
| 5,176,275 | A * | 1/1993 | Bowie | 220/201 |
| 5,223,073 | A * | 6/1993 | Freddi et al. | 156/381 |
| 5,417,674 | A * | 5/1995 | Smith et al. | 604/289 |
| 5,470,323 | A * | 11/1995 | Smith et al. | 604/289 |
| 5,500,067 | A * | 3/1996 | Jenkner | 156/146 |
| 5,770,003 | A * | 6/1998 | Tabaroni et al. | 156/382 |
| 5,857,620 | A * | 1/1999 | Nakoneczny | 239/47 |
| 5,996,782 | A * | 12/1999 | Sperry et al. | 206/219 |
| 6,112,537 | A * | 9/2000 | Broadbent | 62/293 |
| 6,419,118 | B1 * | 7/2002 | Rees et al. | 222/94 |
| 6,547,468 | B2 * | 4/2003 | Gruenbacher et al. | 401/133 |
| 7,493,930 | B2 * | 2/2009 | Finetti et al. | 156/381 |
| 7,578,114 | B2 * | 8/2009 | Duffield et al. | 53/476 |
| 7,618,406 | B2 * | 11/2009 | Roger | 604/410 |
| 2003/0108705 | A1 * | 6/2003 | Duffield et al. | 428/36.6 |
| 2004/0115375 | A1 * | 6/2004 | Duffield et al. | 428/34.1 |
| 2006/0003057 | A1 * | 1/2006 | Kelly et al. | 426/118 |

FOREIGN PATENT DOCUMENTS

| | | |
|---|---|---|
| EP | 2000920849 | 6/1999 |
| EP | 2000972506 | 1/2000 |
| EP | 1136230 | 9/2001 |
| EP | 2001136230 | 9/2001 |
| EP | 1424056 | 6/2004 |
| EP | 2001424056 | 6/2004 |
| WO | WO9416664 | 8/1994 |
| WO | WO03082549 | 10/2003 |

OTHER PUBLICATIONS

3-Page International Search Report mailed Aug. 21, 2007 in PCT/FR2007/000279.

* cited by examiner

METHOD FOR MAKING A CONTAINER COMPRISING TWO OR MORE COMPARTMENTS

BACKGROUND

The object of the present invention is a method for manufacturing a container, such as a primary packaging, of the type comprising two or more compartments.

The method according to the invention can be applied, for example, to the manufacture of a control indicator of conservation temperature for refrigerated products such as the one described in patent WO/9963313. The temperature control device described in that patent is in the form of an enclosure consisting of two compartments separated by a narrowing capable of opening or tearing upon stress. The freezing of the liquid products contained within the compartments causes these products to dilate, which results in the opening of the narrowing separating the two compartment. Consequently, when the ambient temperature reaches the melt temperature of the products, the latter recover their liquid state and can thus mix within the two compartments because of the absence of a tight separation between the two compartments.

By predetermined stress will be meant herein either the stress that is capable of breaking the separation between the compartments of the container, such as thermal stress described above, or mechanical stress that is applied voluntarily from the outside of the container, such as, for example, a manual pressure. The predetermined character of the stress not only involves the nature of this stress (either thermal, mechanical, etc.) but also the width of the stress (temperature range, amplitude of forces, etc.).

A medical bag is also known from EP 1 424 956, having at least two compartments, which is made up of a flexible polymer material and is intended to make medical mixtures. This bag is made by means of welding on the edge areas of a folded flexible sheet of polymer material while the two compartments are separated from each other by means of a welding which has been made at a lower temperature than the edge welding temperature. Thereby, this welding that has been made at a lower temperature is more fragile and hence tearable under the effect of a force ranging between 5N e 20 N. The thus-obtained flexible bag can contain two different products separated within each compartment and the breakage of the separation welding allows these two products to be admixed in order to use the thus-obtained mixture. However, while such flexible bag can be appropriately used in the medical field to contain drug solutions, it however has some drawbacks. In fact, this flexible bag may be fragile when handled, in the event of impacts or stress applied to the bag, which may result in an early breakage of the compartments leading to an undesired mixing of the products. Further, such a bag may not be of use as a control indicator of conservation temperature for refrigerated products, because the dilation of the contents upon freezing would be absorbed by the flexibility of the material making up the bag.

A method for manufacturing such type of a bag is also provided in EP 0 972 506 in which two sheets of plastic material in the form of a multi-layer film are superimposed and welded along the periphery thereof, a middle portion separating the bag in two compartments. This separating portion is obtained by the adhesion of the two superimposed sheets resulting from a method of electron-beam crosslinking of the multi-layer film. Also in this case, a pressure of a sufficient force applied to the bag allows breaking the adhesion and forming a passageway within the compartments, thus allowing the contents thereof to be admixed. Furthermore, as with the flexible bag described above, any stress that is undesirably applied thereto while it is being handled may lead to an early breakage of the separation. Accordingly, this bag cannot be used as a storage temperature control indicator for refrigerated products.

It is understood that, in order to protect the products against this type of consequences arising from impacts, for example, it is known to manufacture non-flexible containers which have some rigidity such as those obtained according to the manufacturing method described in EP 1 136 230, in which two sheets of heat-sealable material are welded in order to define a contents cell having an opening. This cell is then placed within a mould, a moulding fluid being then introduced through the opening of the cell within said cell such that the latter will match the inner shape of the mould while hiding the welding within the container. However, this method does not allow providing a container with a separation defining compartments.

The object of the present invention is thus to provide a method for manufacturing a container, such as a primary packaging, of the type comprising at least two compartments, which can function as those described in the patents WO 99/63313, EP 0 972 506 and EP 1 424 056 but does not suffer from the drawbacks thereof and is both easy to make and effective.

SUMMARY

To the purpose, a method according to the present invention is of the type comprising the following steps:
A first thermal welding step which is carried out between two sheets in order to provide the container periphery and carried out at a first temperature such that said welding withstands a predetermined stress, with fill-up orifices being arranged therein,
A second thermal welding step which is carried out in order to form at least one separation between compartments and carried out at a second temperature lower than said first temperature and such that said welding is fragile under said stress,
A third step of filling up said compartments, characterized in that after said first welding step, said two welded sheets are arranged within a mould thus taking the shape of the latter under pressurized gas.

This method allows obtaining a tight container, the compartments thereof being separated by a separation that is fragile under a predetermined stress due to the use of two different heat-sealing temperatures thus allowing to change the sealing degree between tightness and fragileness while having a shape deriving from the mould which provides it with sure mechanical strength and stiffness.

Advantageously, sheets are used which are made of a preferably rigid heat-formable material which, after the first heat-sealing step, under the effect of heat, can be deformed under a pressurized gas that is injected within a mould. Since the walls of the mould are then generally cold, the sheets get cold once again. Consequently, the method according to the invention allows obtaining a container provided with a separation resulting from opposite face portions of material sheet being contacted with each other within the mould and having a mechanical strength and rigidity which provides the same with a good resistance when it is being handled. However, the container obtained has a sufficient deformability to be subjected to a mechanical or thermal pressure thereon in order to break the separation between the compartments.

It will be understood, within the present invention, that said sheets can be bands being cut upon the first welding step.

According to an embodiment of the invention, closing means for this container are then positioned.

Advantageously, the mould is defined such as to place opposite face portions of the sheets in contact with each other, when the two welded sheets are moulded under a pressurized gas, in order to form, by means of the second welding at the level of said contacted portions, said or each separation within said compartments.

Thereby, according to an embodiment, the mould is arranged such as to grip in at least one point the two sheets welded during the first welding step in order that, when the gas is being injected, the sheets take the mould shape by being pushed towards the walls of the latter while the contacted portions that are gripped by the mould provide said or each separation between said compartments by means of the second welding. Therefore, when the heat-welded sheets are positioned at the periphery thereof within the mould, the latter has at least one wall projecting towards the inside of the chamber defined by the mould, which is intended to grip said sheets both with an opposite wall and also projecting within the mould and with the opposite wall of said mould in order that said sheets remain welded and form the separation while the injected gas pushes the two sheets against the walls of the mould and defines the compartments. According to the number of walls projecting within the mould, it is thus possible to provide several separations reaching more than two compartments for a same container.

According to another embodiment of the invention, the second welding is carried out after at least one matrix has penetrated within the mould, when the container is being shaped, towards the inside of the container, and draws therewith at least one face of said container without tearing said face. This results in the formation of said or each separation between the compartments. For example, the separation may be obtained by penetration of two matrixes towards the inside of the container by drawing two faces, opposite to each other, the two faces joining to each other to be then welded. A container is thus obtained which comprises two compartments. In another exemplary embodiment, only one matrix that is provided on the mould penetrates inside the container by drawing only one face of the container and reaches the opposite face where the welding will be carried out in order to seal the two faces and form the separation of the container. A container comprising two compartments will be obtained also in this case.

The mould is shaped such as to have at least one matrix that can be drawn to the inside of the chamber of the mould in order to draw therewith at least one face of said container being shaped within the mould without tearing of said face.

It is thus possible providing several separations ending at more than two compartments within a same container.

According to another characteristic of the invention, the mould is parallelepiped-shaped, preferably rectangular or square.

Advantageously, said at least one wall projecting from the mould or said at least one mould matrix used in the method according to the invention will have at least one acute angle. Thereby, the separation between said compartments will have at least one acute angle. This acute angle is a prompt for breakage which allows facilitating the breakage of the separation following stress.

According to another characteristic of the invention, the compartments are filled by means of the fill-up orifices by different wet products of varying density, from liquid to dense.

The object of the invention is also a container comprising at least two compartments and obtained by means of said manufacturing method.

According to an embodiment of the invention, said container obtained by means of said manufacturing method according to the invention comprises at least two compartments that are separated by means of a fragile separation under a predetermined stress and which has at least one acute angle such as to facilitate the breakage of said welding after said stress. This type of container is advantageous, for example, for use in the control of the cold chain or packaging of different products which are intended to be mixed after a predetermined stress on said container, while having a certain rigidity unlike a flexible bag.

BRIEF DESCRIPTION OF THE DRAWINGS

The above-mentioned characteristics of the invention, and others, will be better understood by reading the following description of exemplary embodiments, said description being made in connection with the annexed drawings, in which.

DETAILED DESCRIPTION

Figure 1A:
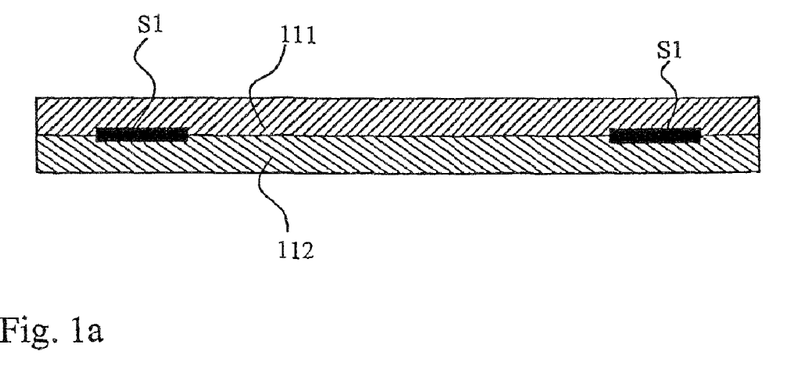
FIG. 1 is a side cross-sectional view of a container obtained after the first welding step of the method according to the present invention.
Figure 1B:
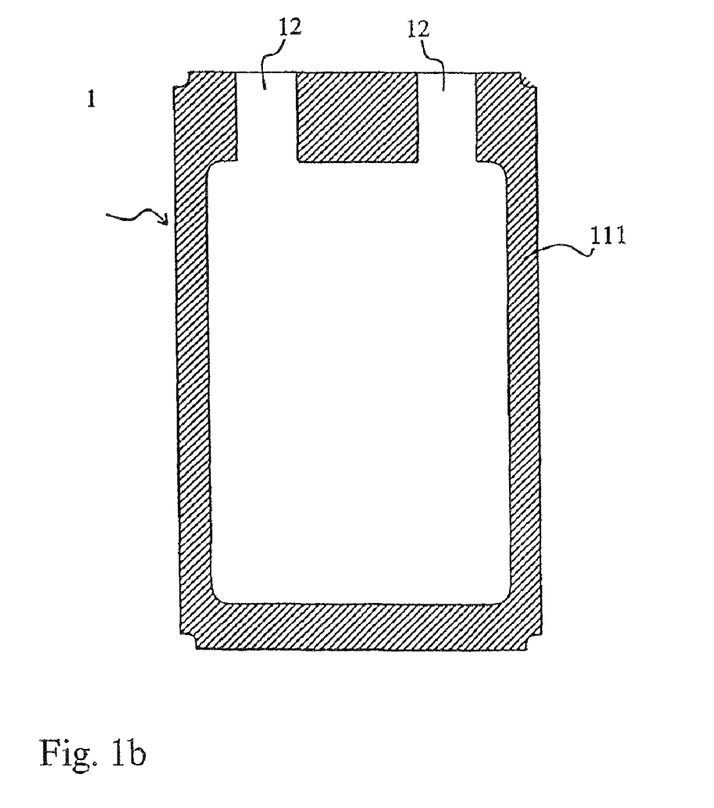
FIG. 1b is a front cross-sectional view of a container obtained after the first welding step of the method according to the present invention.

As illustrated in FIGS. 1a and 1b, during the first step of a method according to the invention, a first thermal welding at said high temperature S1 is carried out between two sheets 111 and 112, either flexible or rigid, such as to provide the perimeter of the container 1. The welding temperature S1 is such as to allow sealing the perimeter of the container in a so-called tight manner, or resistant to a predetermined stress.

The first step of thermal welding S1 is carried out while arranging fill-up orifices 12 of the container 1, as illustrated in FIG. 1b. These fill-up orifices 12 are provided such as to allow the container compartments to be later filled up with the products to be packaged.

Following the first welding step S1, the two welded sheets 111 and 112 are arranged within a mould 2 of which they take the shape under a pressurized gas being injected, for example, through the fill-up orifices 12 (see FIG. 1b).

According to an embodiment, the mould 2' can be shaped such as to grip in at least one point the two sheets 111 and 112 such that, when the gas is being injected, the sheets 111 and 112 take the shape of the mould 2' by being pushed towards the walls of the latter while the contacted walls, by being gripped by the mould, are welded and provide the separation 14 under the effect of heat that is applied at a temperature lower than the preceding welding temperature so that the separation welding S2 is more fragile. At least one separation 14 between two compartments 13 of the container 1 has been thus formed upon gas blowing, which separation results from the portions of the faces of the sheets 111 and 112 that are gripped by the mould 2' and welded. The heat applied to carry out this second welding S2 can advantageously be the residual heat of the preceding heat-sealing step.

Figure 1C:
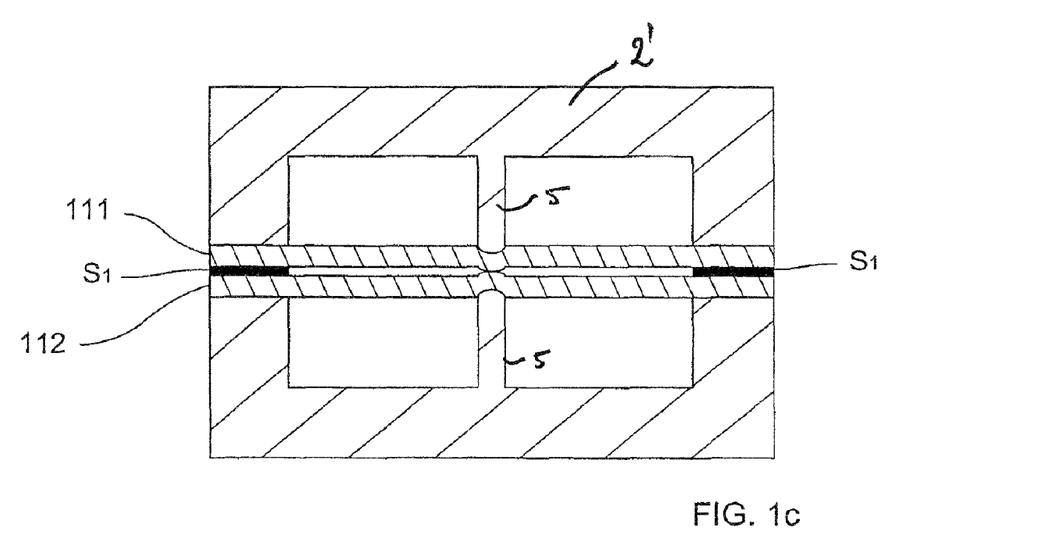
FIG. 1c is a top cross-sectional view of a mould closing the container obtained after the first welding step of the method according to the present invention.
Figure 1D:
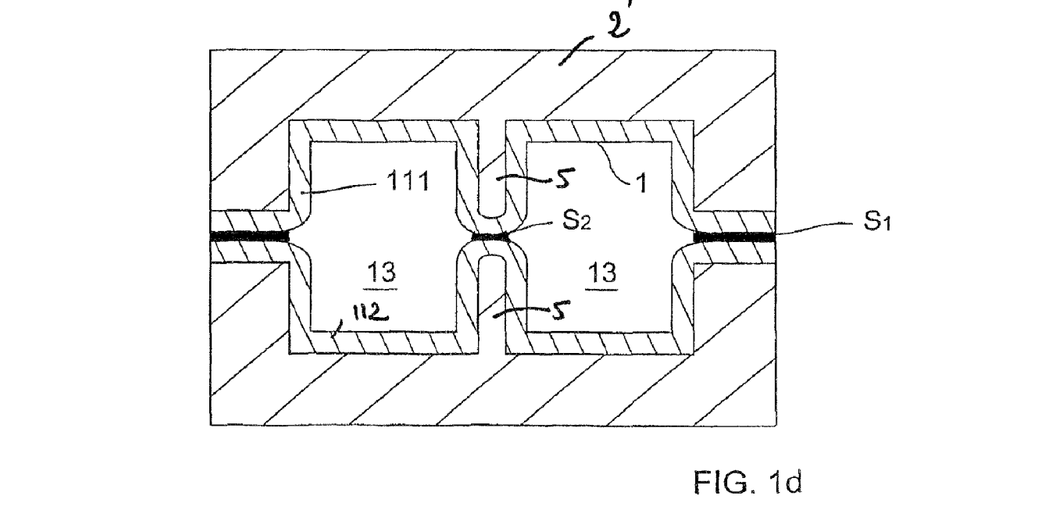
FIG. 1d is a top cross-sectional view of a mould closing the container obtained after the second welding step of the method according to the present invention.

The mould can thus have two walls 5 arranged projecting towards the inside of said mould 2', opposite to one another such as to grip the two sheets 111 and 112 to each other as can be seen in FIGS. 1c and 1d. Only one wall projecting to the inside of the mould can be also provided, which grips the two sheets 111 and 112 against the opposite wall of mould 2.

Figure 2A:
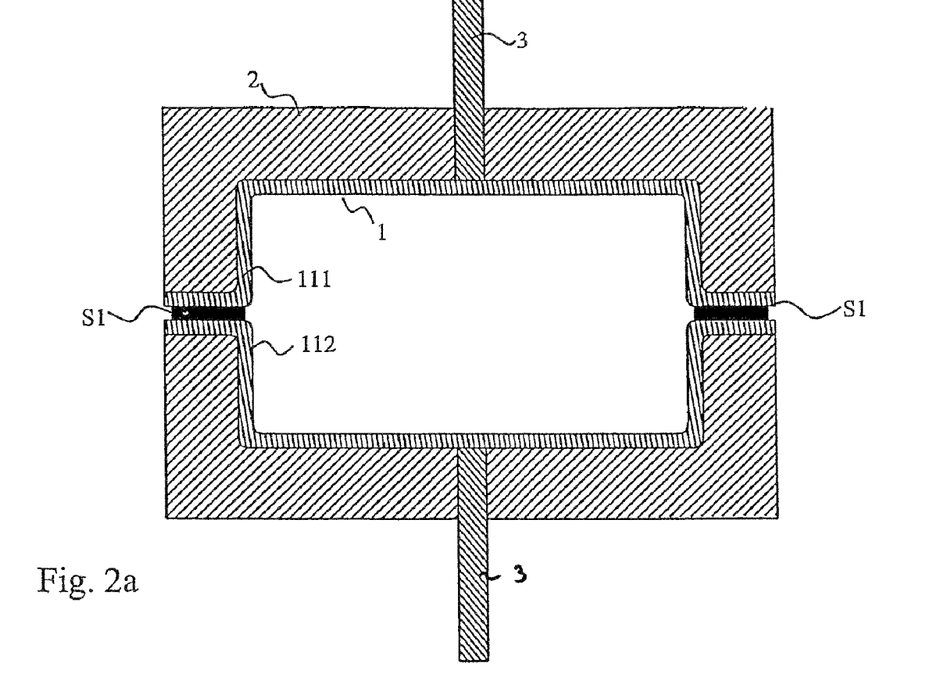
FIG. 2a is a top cross-sectional view of a mould closing the container obtained after the first welding step of a variant embodiment of the method according to the present invention.
Figure 2B:
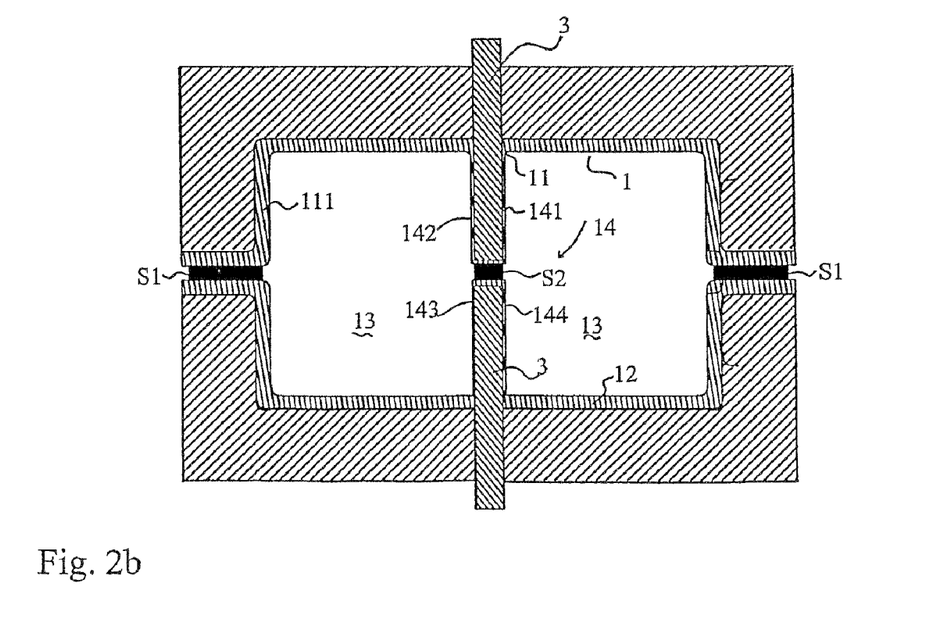
FIG. 2b is a top cross-sectional view of a mould closing the container obtained after the second welding step of a variant embodiment of the method according to the present invention.

In a variant embodiment of the method according to the invention, after the gas has been blown and the sheets 111 and 112 have been placed against the walls of mould 2, at least one matrix 3 (in the example illustrated in FIGS. 2a and 2b, two matrixes 3) penetrates within the mould 2 and draws therewith, without piercing them, the opposite faces 11 and 12 of the container 1 which are thus in contact with each other. Here, by adding the required heat, a second welding S2 is carried out between the two faces 11 and 12 at a temperature lower than the temperature of the first welding S1, a temperature at which said welding S2 is fragile under a predefined stress. The welding S2 is said to be pealable and allows forming a separation 14 consisting of walls 141 to 144 resulting from portions of faces 11 and 12 which have been drawn by the matrix 3 and thus two compartments 13 of the container 1.

Figure 3:
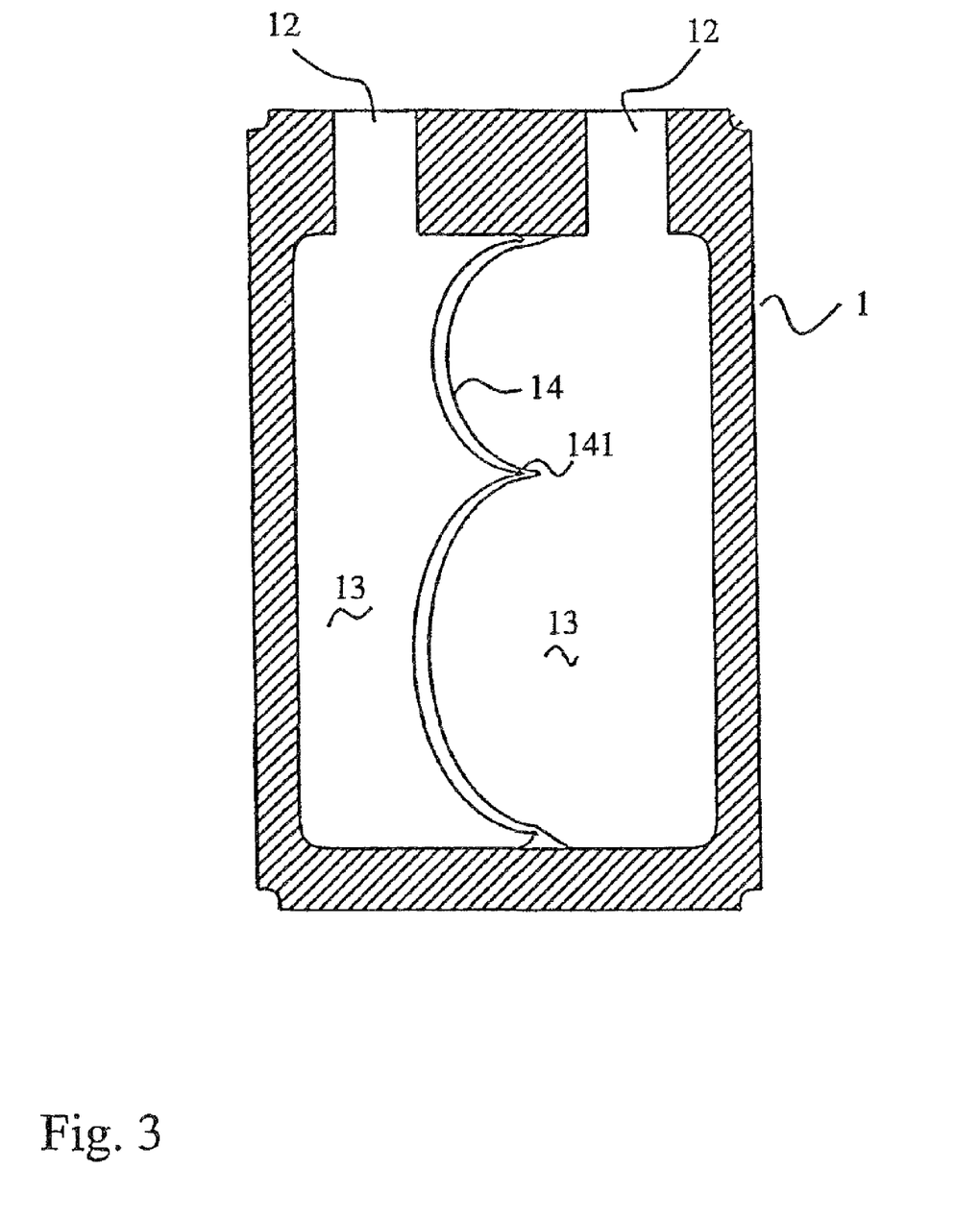
FIG. 3 is a front cross-sectional view of a container obtained after the second welding step of the method according to the present invention.

Advantageously, and how represented in FIG. 3, said separation 14 between the compartments 13 has at least one acute angle 141. In order to give the separation 14 such a configuration, the wall(s) 5 of the mould (see FIG. 6) or the matrix(es) 3 used in the second step has (have) at least one acute angle.

Therefore, the wall(s) 5 or the matrix(es) 3 will allow forming a separation 14 according to a configuration having at least one acute angle 141 identical to the acute angle of said matrix 3. This acute angle 141 in the separation 14 forms a breakage prompt which allows facilitating the breakage of said second welding S2 when it is subjected to a predetermined stress.

Figure 6:
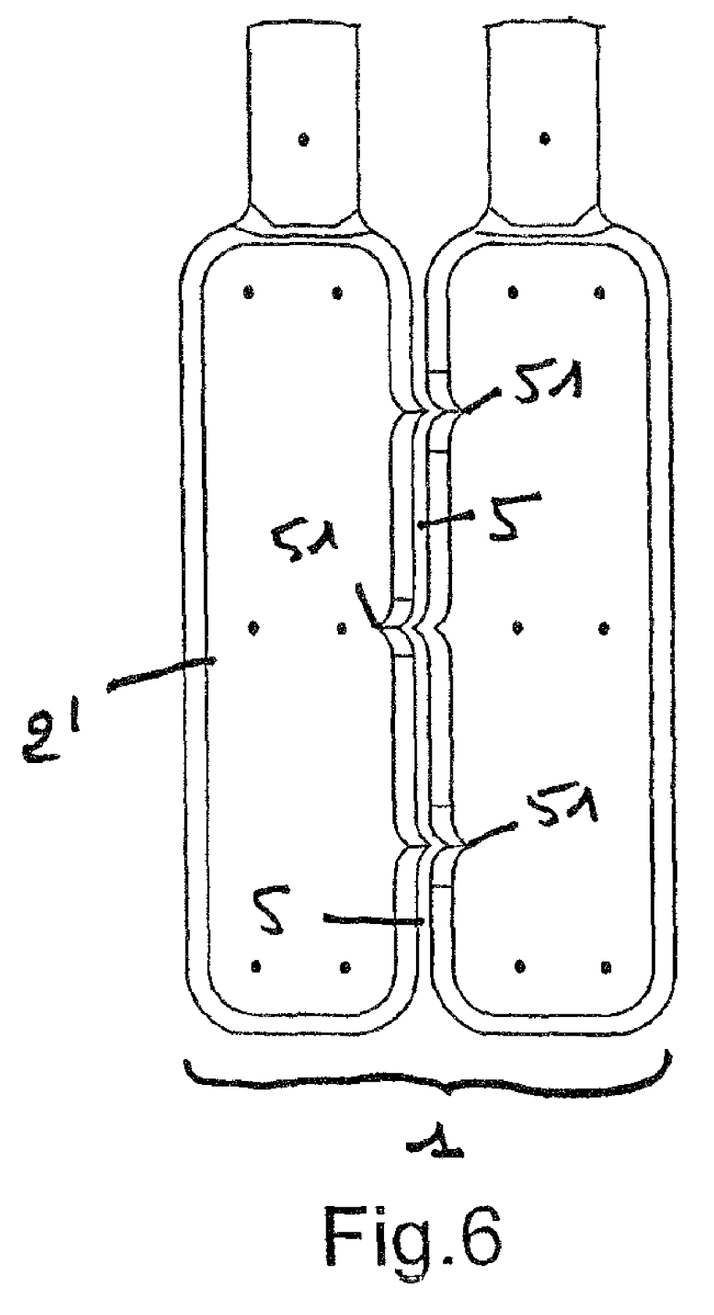
FIG. 6 is a plane view of an exemplary mould for carrying out the method of the invention.

FIG. 6 illustrates an example of a portion of a mould 2' in which it can be seen that the wall 5 projecting towards the inside of the chamber defined by the mould 2' comprise three acute angles 51 such as to form a separation within the container which will have three acute angles. The compartments of the container are defined on both sides of the wall 5. The other portion of the mould 2' or half-mould can be identical, the opposite walls 5 gripping in this case the sheets 112 and 111 inserted within the mould 2'.

The third step of the method according to the invention is the filling-up of said compartments 13 by means of the orifices 12 that have been previously arranged during the first step of the method for manufacturing the container 1 (see FIG. 3). The products intended to be contained within a container obtained by means of the manufacturing method according to the invention are liquid products of a density that can range from low to high.

Figure 4:
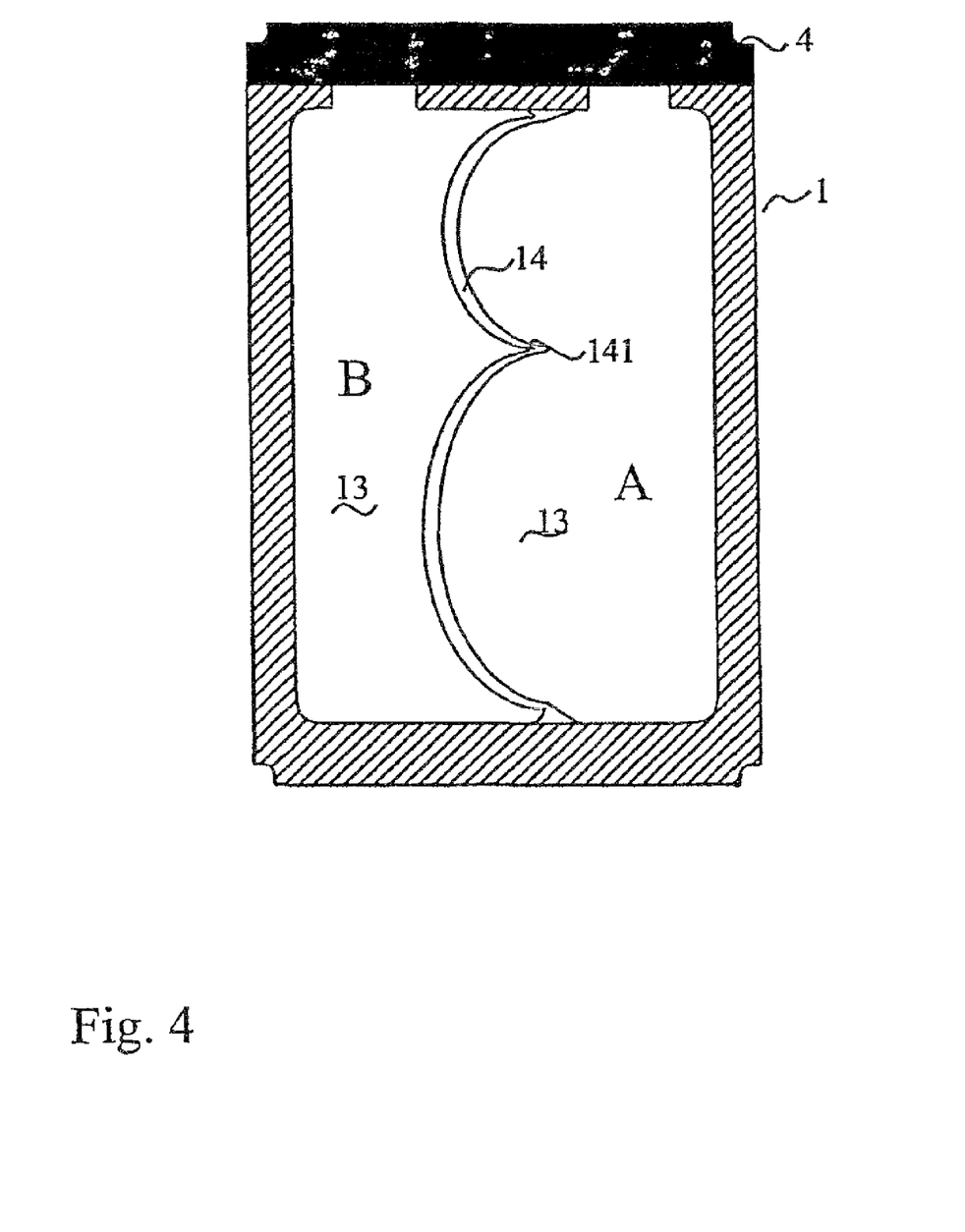
FIG. 4 is a front cross-sectional view of a container obtained according to the method of the present invention.

Finally, the container can be sealed by placing closing means 4 for each one of the compartments such as illustrated in FIG. 4. The closure of the container can be particularly obtained by means of another thermal welding at high temperature in order to seal the fill-up orifices in a tight manner.

FIG. 4 illustrates a container 1 that is obtained by means of the manufacturing method according to the invention.

Figure 5:
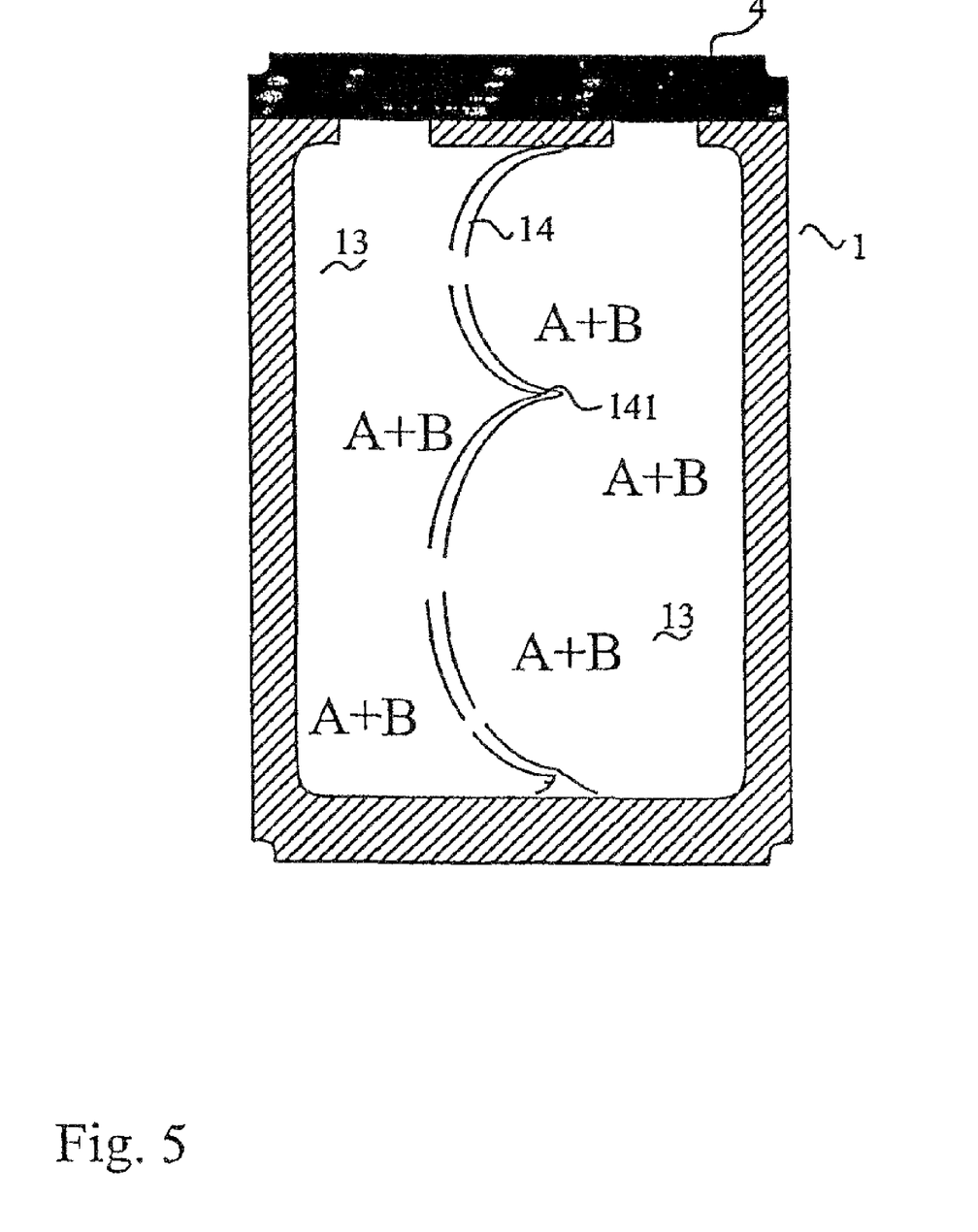
FIG. 5 is a front cross-sectional view of a container obtained according to the method of the present invention after stress.

In this embodiment, said container 1 comprises two compartments 13 that are separated by a separation 14 that has an acute angle 141. The compartments 13 contain different liquid products, respectively A and B. As illustrated in FIG. 5, these two liquid products will be mixed after the separation 14 has been broken by stress. The stress may be, for example, a thermal stress such as described above. Thereby, the freezing which has the effect of dilating the products causes the separation 14 to be broken. Consequently, when the ambient temperature reaches the melt temperature of the products, the latter recover the liquid state thereof and can be thus admixed within the two compartments 13. Such principle can, for example, be used for controlling the cold chain.

The stress can be also be mechanical and obtained by means of a pressure being applied on one of the container compartments, said container remaining however deformable, despite being rigid.

Thereby, the present invention provides an easy and effective method for manufacturing a container of the type comprising at least two compartments, said container finding application in all the fields where products, which are at first separated, are to be mixed at a determined time.

The invention claimed is:

1. A method of manufacturing a container having multiple compartments, the method comprising:
   thermal welding a first sheet to a second sheet at a first temperature to form a periphery of the container that is able to withstand a predetermined stress, the periphery including at least two filling orifices, the first and second sheets being formed from a generally rigid heat-formable material;
   heating the first and second sheets to enable deformation of the first and second sheets;
   arranging the first and second sheets within a mold defining a predetermined shape;
   separating the first and second sheets with pressurized air blown into the mold such that the first and second sheets form a generally-rigid container having the predetermined shape, the generally-rigid container configured to include at least two compartments separated by a seal line collectively defined by the first and second sheets within the periphery; and
   thermal welding the first sheet to the second sheet along the seal line at a second temperature lower than the first temperature to form a frangible seal between the at least two compartments of the generally-rigid container, the frangible seal being frangible under the predetermined breaking stress based on the second temperature,
   wherein a liquid placed in at least one of the compartments and frozen within the at least one compartment of the generally-rigid container would exert a stress on the frangible seal higher than the predetermined stress, thereby breaking the frangible seal so that the liquid would mix into the other of the compartments.

2. The method of claim 1, wherein forming the frangible seal by thermal welding at the second temperature further comprises:

forming a breakage prompt configured to facilitate the breaking of the frangible seal at the predetermined stress.

3. The method of claim 2, wherein forming the frangible seal by thermal welding at the second temperature further comprises:

forming at least one acutely-angled portion to define the breakage prompt.

4. The method of claim 3, wherein forming the frangible seal by thermal welding at the second temperature further comprises:

forming the at least one acutely-angled portion between at least two curved portions of the frangible seal.

5. The method of claim 1, wherein the mold includes at least two cavities completely separated by a contacting portion such that separating the first and second sheets with pressurized air simultaneously forms the seal line along the contacting portion of the mold.

6. The method of claim 1, wherein the mold includes one cavity having the predetermined shape, and separating the first and second sheets with pressurized air further includes:

inserting at least one matrix into the cavity to deform at least one of the first and second sheets to form a contacting portion with the other of the first and second sheets, the contacting portion defining the seal line between the two compartments.

7. The method of claim 1, wherein the predetermined shape is a parallelepiped.

8. A container having multiple compartments, formed by a method comprising:

thermal welding a first sheet to a second sheet at a first temperature to form a periphery of the container that is able to withstand a predetermined stress, the periphery including at least two filling orifices, the first and second sheets being formed from a generally rigid heat-formable material;

heating the first and second sheets to enable deformation of the first and second sheets;

arranging the first and second sheets within a mold defining a predetermined shape;

separating the first and second sheets with pressurized air blown into the mold such that the first and second sheets form a generally-rigid container having the predetermined shape, the generally-rigid container configured to include at least two compartments separated by a seal line collectively defined by the first and second sheets within the periphery; and thermal welding the first sheet to the second sheet along the seal line at a second temperature lower than the first temperature to form a frangible seal between the at least two compartments of the generally-rigid container, the frangible seal being frangible under the predetermined breaking stress, wherein a liquid placed in at least one of the compartments and frozen within the at least one compartment of the generally-rigid container would exert a stress on the frangible seal higher than the predetermined stress, thereby breaking the frangible seal so that the liquid would mix into the other of the compartments.

9. The container of claim 8, wherein forming the frangible seal by thermal welding at the second temperature further comprises:

forming a breakage prompt configured to facilitate the breaking of the frangible seal at the predetermined stress.

10. The container of claim 9, wherein forming the frangible seal by thermal welding at the second temperature further comprises:

forming at least one acutely-angled portion to define the breakage prompt.

11. The container of claim 10, wherein forming the frangible seal by thermal welding at the second temperature further comprises:

forming the at least one acutely-angled portion between at least two curved portions of the frangible seal.

* * * * *